United States Patent
Schein

(10) Patent No.: US 8,856,604 B2
(45) Date of Patent: Oct. 7, 2014

(54) TRANSCEIVER FEEDBACK AND/OR RE-TRANSMISSION CONTROL

(75) Inventor: Brett Schein, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1017 days.

(21) Appl. No.: 12/221,116

(22) Filed: Jul. 31, 2008

(65) Prior Publication Data

US 2009/0089639 A1 Apr. 2, 2009

Related U.S. Application Data

(60) Provisional application No. 60/997,273, filed on Oct. 2, 2007.

(51) Int. Cl.
*H04L 1/00* (2006.01)
*H04L 1/16* (2006.01)

(52) U.S. Cl.
CPC ............ *H04L 1/1678* (2013.01); *H04L 1/1635* (2013.01)
USPC ............................ 714/748; 714/746; 714/749

(58) Field of Classification Search
USPC ..................... 714/748, 752, 749, 750; 455/69
See application file for complete search history.

(56) References Cited

U.S. PATENT DOCUMENTS

| | | | |
|---|---|---|---|
| 6,505,034 B1 | 1/2003 | Wellig | |
| 7,729,665 B2* | 6/2010 | Sung et al. | 455/69 |
| 2005/0201339 A1* | 9/2005 | Mangin et al. | 370/337 |
| 2006/0250963 A1* | 11/2006 | Jin et al. | 370/236 |
| 2007/0086367 A1 | 4/2007 | Sung et al. | |
| 2007/0088494 A1* | 4/2007 | Rothman et al. | 701/200 |
| 2008/0022178 A1* | 1/2008 | Kim et al. | 714/748 |
| 2008/0025319 A1* | 1/2008 | Veerapuneni et al. | 370/395.52 |

OTHER PUBLICATIONS

IEEE, *Part 16: Air Interface for Broadband Wireless Access Systems*, P802.16Rev2/D1 (Oct. 2007).

* cited by examiner

*Primary Examiner* — Sarai Butler
(74) *Attorney, Agent, or Firm* — Sterne, Kessler, Goldstein & Fox P.L.L.C.

(57) ABSTRACT

A method and apparatus of providing ARQ feedback is disclosed. A first step of one method includes a transmitter transmitting ARQ blocks. A second step includes a receiver transmitting ARQ feedback messages, wherein each ARQ feedback message includes a time reference that indicates a transmission time of a latest transmission burst accounted for in the ARQ feedback message.

20 Claims, 7 Drawing Sheets

TRANSCEIVER FEEDBACK AND/OR RE-TRANSMISSION CONTROL

CROSS-REFERENCE TO RELATED APPLICATION

This application claims the benefit of U.S. Provisional Application No. 60/997,273 filed on Oct. 2, 2007, which is incorporated by reference in its entirety herein.

FIELD OF THE DESCRIBED EMBODIMENTS

The invention relates generally to wireless communications. More particularly, the invention relates to controlling re-transmissions of ARQ transmission systems.

BACKGROUND

Digital data transmissions over wired and wireless links are sometimes corrupted, for instance, by noise in the link or channel, by interference from other transmissions (e.g., radio), or by environmental factors related to, for example, the speed, direction, location and requests between transmitting and receiving units. Even with clear communication channels (i.e., channels with limited corruption), that lend themselves to the high data rates, it may not be possible to appropriately decode the data stream with the requisite error rates. Digital data transmissions may also be limited by an inability of the receiving or transmitting equipment to appropriately encode and decode the data stream at the speeds desired with the requisite error rates.

In two-way systems, an opportunity for requesting that a data packet be retransmitted upon detection of an error may be available. An automatic repeat request (ARQ) may be sent upon detection of an error using, for example, a parity bit check or a cyclic redundancy check (CRC), and then the original data packet may be discarded. Upon receipt of an ARQ request, the packet may simply be retransmitted in its original form.

FIG. 1 shows a sequence of transmissions between a transmitter and a receiver in which the transmitter can not definitively determine whether an ARQ block has been successfully transmitted. An ARQ feedback (ARQ FB) to the transmitter from the receiver attempts to provide the transmitter with knowledge as to whether or not the receiver received a transmitted ARQ block. As shown, the ARQ FB can include an ACK which indicates that the ARQ block was received, and/or the ARQ FB can include a NACK which indicates that the ARQ block was not received.

The first transmission 111 of FIG. 1 includes a ARQ block "0" that results in an ARQ FB 112 of ACK0 from the receiver that indicates the "0" ARQ block was successfully received. A second transmission 113 includes an ARQ block "1". This transmission 113, as indicated with an "X" in the transmit direction, is not successful. The receiver subsequently provides, for example, another ARQ FB 114 of ACK0 from the receiver that indicates the ARQ block "0" was successfully received, but does not include any feedback regarding the ARQ block "1" because the ARQ block "1" was not successfully received.

A third transmission 115 includes an ARQ block "2". However, due to not having received an ACK for ARQ block "1", the transmitter retransmits 117 the ARQ block "1". A problem occurs because the transmitter is not able to determine if, for example, the NACK 116 of ARQ block "1" is due to a failure to receive the latest transmission 117 of ARQ block "1", or as a result of failure to receive an earlier transmission of the ARQ block "1". This problem can result in another transmission 118 of the ARQ block "1", potentially resulting in wasted (additional) transmissions.

It is desirable to have a system and method for addressing the above-described ARQ transmission and ARQ feedback problem.

SUMMARY OF THE INVENTION

An embodiment includes a method of ARQ feedback. A first step of the method includes a transmitter transmitting ARQ blocks. A second step includes a receiver transmitting ARQ feedback messages, wherein each ARQ feedback message includes a time reference that indicates a transmission time of a latest transmission burst accounted for in the ARQ feedback message.

Another embodiment includes a method of a WiMAX subscriber providing ARQ feedback. The method includes the subscriber receiving ARQ blocks, and the subscriber transmitting ARQ feedback messages, wherein each ARQ feedback message includes a time reference that indicates a transmission time of a latest transmission burst accounted for in the ARQ feedback message.

Other aspects and advantages of the present invention will become apparent from the following detailed description, taken in conjunction with the accompanying drawings, illustrating by way of example the principles of the invention.

DETAILED DESCRIPTION

Method and apparatus for controlling transmission and/or feedback control of ARQ blocks are disclosed. The disclosed embodiments provide a transmitter with a time stamp within ARQ feedback, enabling the transmitter to determine whether an ARQ block has been properly received by a receiver.

Figure 1:
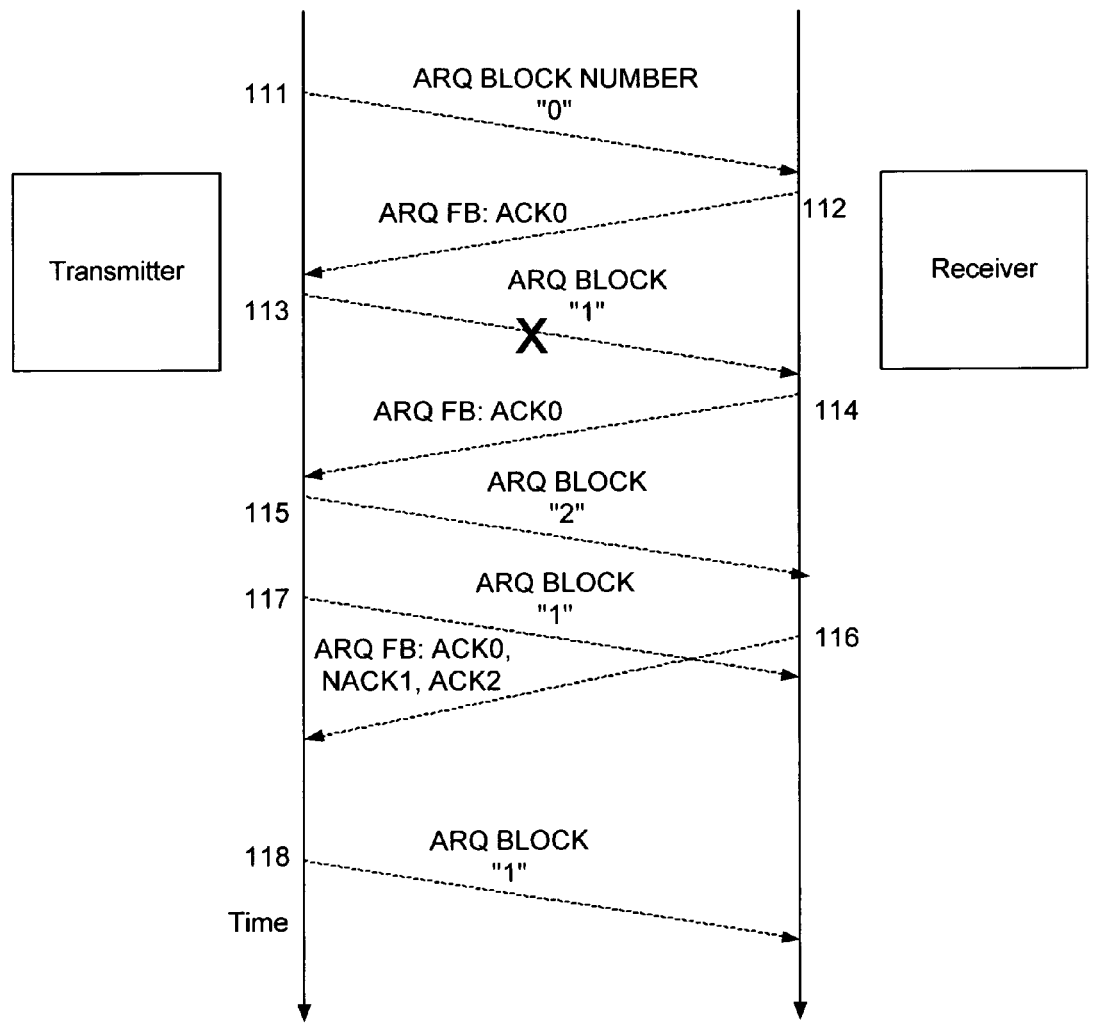
FIG. 1 shows a sequence of interactions between a transmitter and a receiver.
Figure 2:
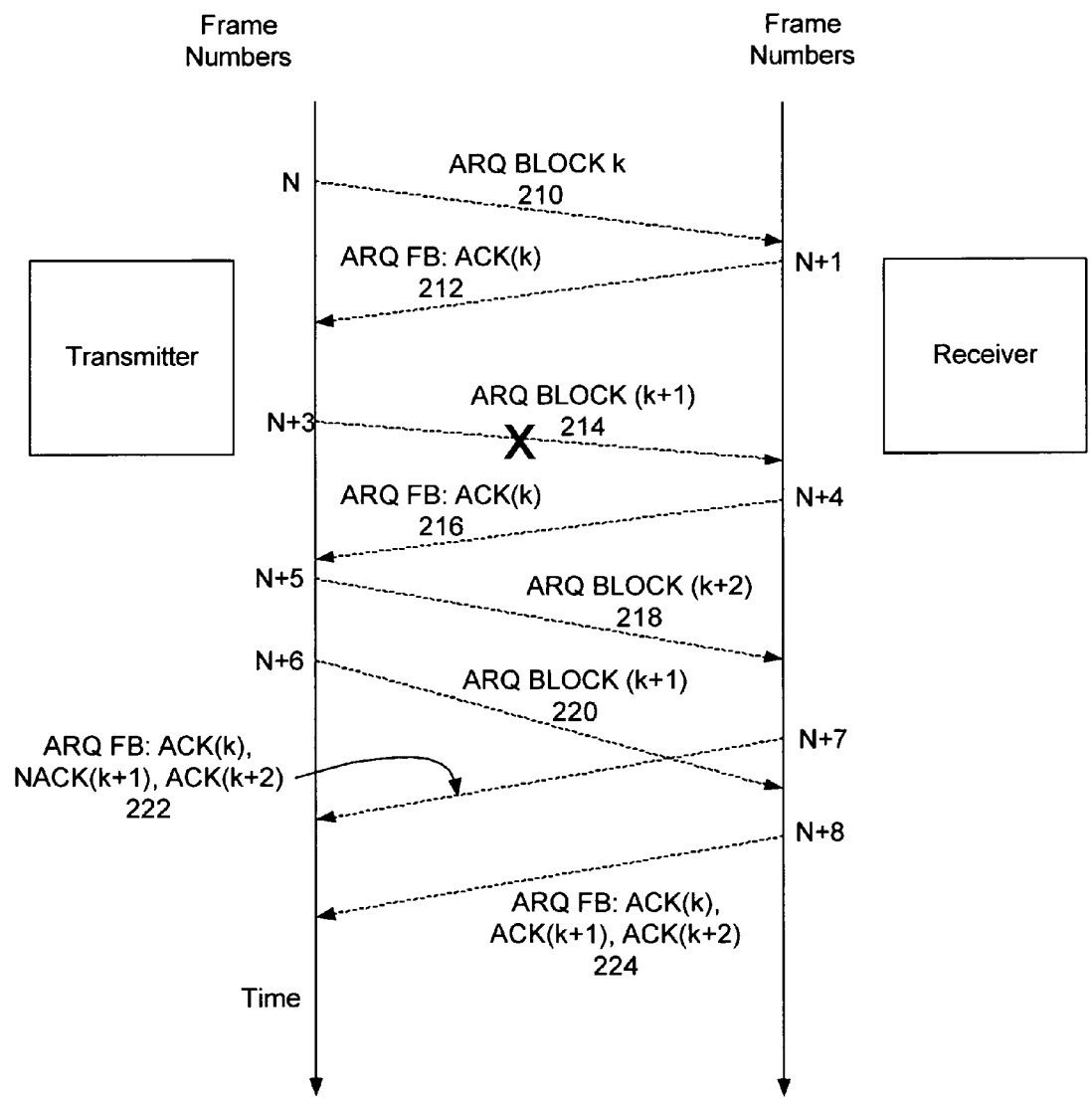
FIG. 2 shows a sequence of interactions between a transmitter and a receiver, wherein the receiver provides a time stamp within an ARQ feedback message for the transmitter.

FIG. 2 shows a sequence of interactions between a transmitter and a receiver wherein the receiver provides a time stamp within an ARQ feedback message for the transmitter, allowing the transmitter to determine whether a latest transmission of a specific ARQ block, for example, was properly received. In one form, the time stamp provides an indication of the last transmission frame successfully received and processed by the receiver. As shown, the transmitter transmits an ARQ block k (210) during a frame N. The receiver responds by transmitting an ARQ feedback message ARQ FB: ACK(k) (212) at, for example, frame N+1. This ARQ feedback message includes an indicator of the last successfully received transmission frame. As shown, the last successfully received frame is, for example, the transmission at frame N.

The transmitter subsequently transmits an ARQ block k+1 (214) at, for example, frame N+3. This transmission, as indicated with an "X" in the transmit direction, is not successful. The receiver subsequently transmits another ARQ feedback message ARQ FB: ACK(k) (216) at frame N+4 that includes a time stamp (for example, frame number) that the ARQ FB incorporates all transmission up to and including frame N+3. That is, the frame number indicates to the transmitter the latest transmission frame for which the ARQ feedback message is applicable. The ARQ feedback message ARQ FB: ACK(k) (216) indicates to the transmitter that the ARQ block k+1 (214) transmission was not successfully received by the ARQ receiver.

The transmitter subsequently transmits the ARQ block k+2 (218) during, for example, frame N+5. The transmitter subsequently retransmits the ARQ block k+1 (220) at frame N+6. The receiver subsequently transmits another ARQ feedback message ARQ FB: ACK(k), NACK(k+1), ACK(k+2) (222) at frame N+7 that includes a time stamp (for example, frame number) that the ARQ FB incorporates all transmission up to, for example, frame N+5. The transmitter is able to deduce that the ARQ FB NACK(k+1) is not directed to the ARQ block k+1 (220) because the time stamp (frame) of the most recent ARQ FB NACK(k+1) is time stamped with the frame number N+5. As shown, the receiver then transmits an ARQ feedback message ARQ FB: ACK(k), ACK(k+1), ACK(k+2) (224) at frame N+8.

The frame numbers are synchronized at both the transmitter and the receiver, and therefore, the transmitter and the receiver share a common timing reference. The shared timing reference can be achieved, for example, by a base station of a wireless network transmitting the frame number within a burst within a frame. A subscriber station of the wireless network that wirelessly receives the frame can associate that frame number with every burst the subscriber station receives and transmits during that frame.

Figure 3:
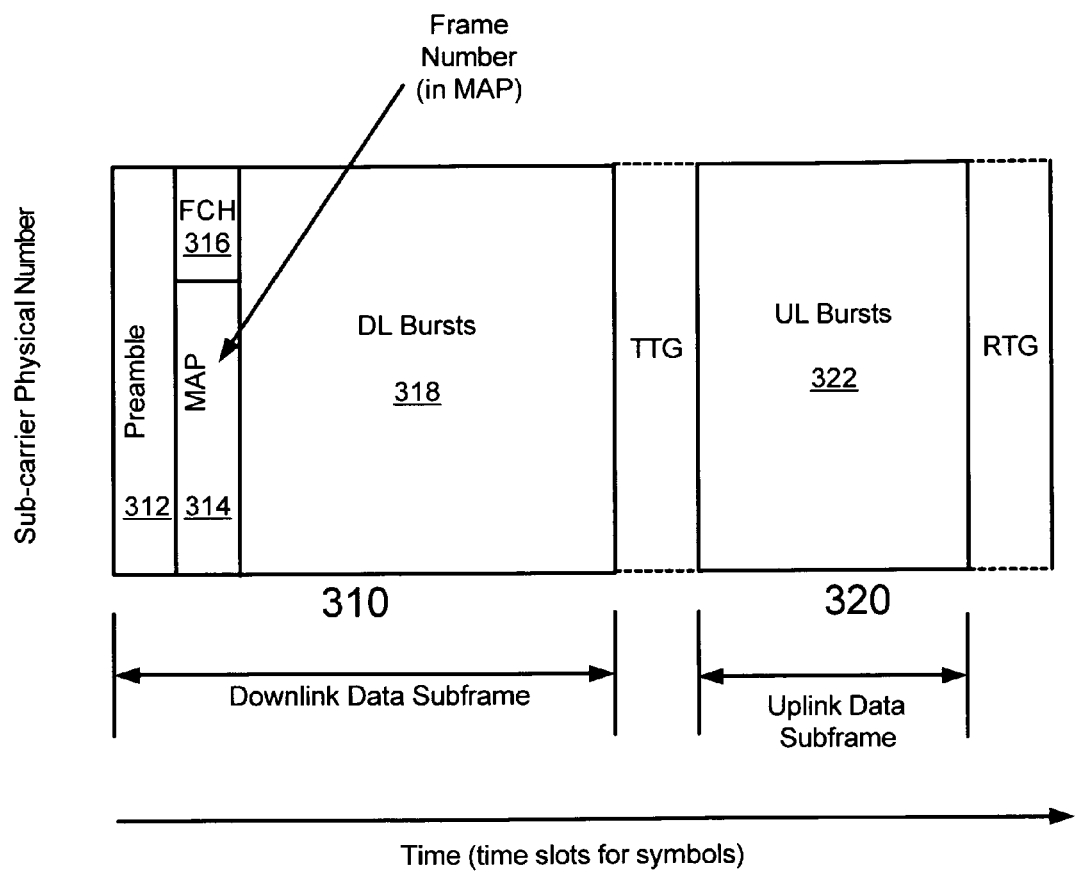
FIG. 3 shows an example of downlink and uplink frame that can be used for scheduled wireless communications.

FIG. 3 shows an example of downlink (DL) 310 and uplink (UL) 320 frame that can be used for scheduled wireless communications, such as, WiMAX wireless communications. For an embodiment, the DL 310 frame and the UL 320 frame include sub-carriers and time slots for OFDM symbols. The DL 310 frame includes a preamble 312 and a MAP 314.

The MAP 314 provides information of DL and UL bursts. The MAP can additionally include a frame number for the frame itself. The receiver (for example, a WiMAX subscriber) can associate the frame number with the UL and DL bursts 318, 322, and therefore, with the payload within the bursts 318, 322. Guards TTG and RTG are included between the downlink and uplink frames. The DL 310 can additionally include an FCH (frame control header) 316 that provides information for decoding payload and decoding the MAP.

Figure 4:
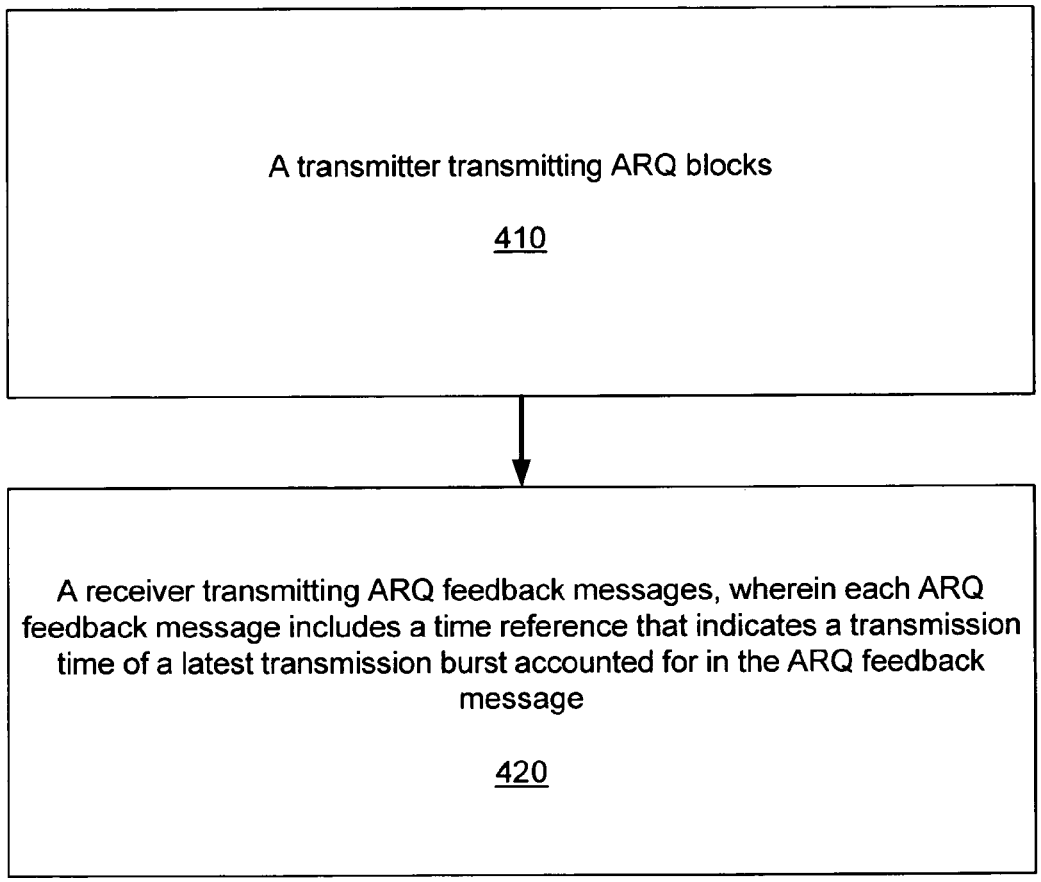
FIG. 4 is a flow chart showing steps of an example of a method of ARQ feedback.

FIG. 4 is a flow chart showing steps of an example of a method of ARQ feedback. A first step 410 of the method includes a transmitter transmitting ARQ blocks. A second step 420 includes a receiver transmitting ARQ feedback messages, wherein each ARQ feedback message includes a time reference that indicates a transmission time of a latest transmission burst accounted for in the ARQ feedback message.

With information of the timing (time reference) of the transmission time of the latest burst accounted for in the ARQ feedback message, the ARQ transmitter can more readily determine whether a feedback failure message (for example, a NACK) applies to a recently transmitted ARQ block. The ARQ blocks are within the bursts. That is, the bursts include one or more ARQ blocks, or ARQ feedback messages.

For an embodiment, the time reference includes a frame number, and the transmission time includes a transmission frame. For a specific embodiment, the frame number indicates a transmission frame, providing an indicator of all frames accounted for in the ARQ feedback message. That is, the indicator provides an accounting of all frames included with the ARQ feedback message, enabling the transmitter to deduce whether the latest transmission of each ARQ block was received, lost, or not yet processed by the receiver.

For another embodiment, the ARQ feedback message accounts of all ARQ blocks transmitted before the ARQ feedback message is generated, as opposed to when the ARQ feedback message is transmitted by the receiver.

For an embodiment, the ARQ feedback messages further include an indication failure of reception of at least one ARQ block.

For another embodiment, the ARQ feedback message is within a WiMAX ARQ payload, and wherein the WiMAX ARQ payload comprises the time reference. A specific embodiment further includes a byte of data appended to the WiMAX ARQ payload, wherein the byte of data comprises the time reference. This embodiment can further include, for example, a most significant bit of the byte indicating whether the frame number is included with the byte, and a least significant seven bits providing the time reference. The time reference can include, for example, a frame number.

Figure 5:
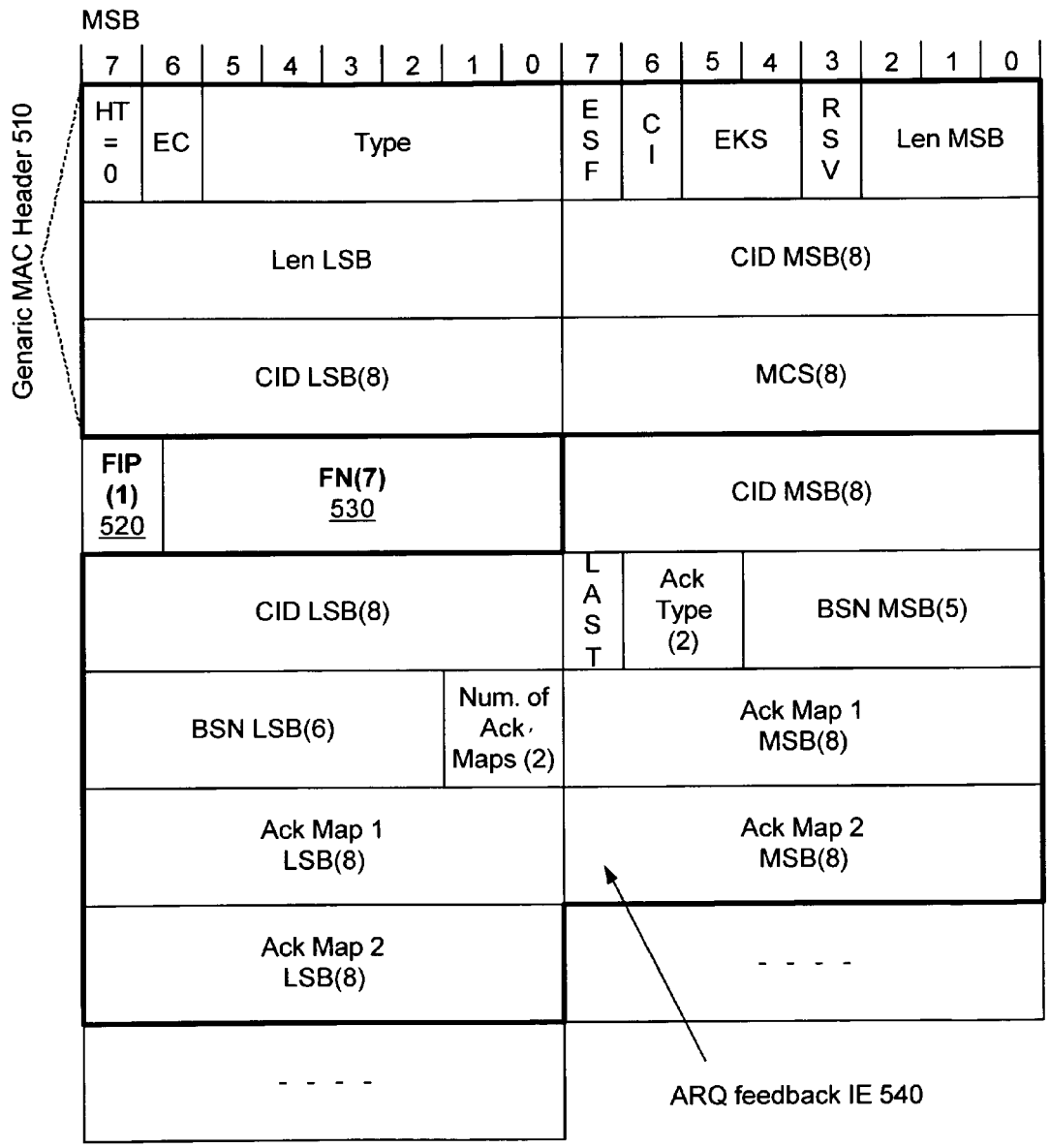
FIG. 5 shows an example of MAC PDU with and ARQ Feedback including a time stamp.

FIG. 5 shows an example of MAC (media access control) PDU (packet data unit) with an ARQ Feedback including a time stamp. As shown, the MAC PDU includes the elements of a generic MAC header 510. However, the MAC PDU additionally includes a FIP (frame information present) 520, and a 7 bit FN (frame number time stamp) 530. An embodiment of the FIP 520 and the FN 530 includes the combination of the FIP 520 and the FN 530 occupying one byte. Following the FIP 520 and the FN 530 is an ARQ feedback IE 540. The FN/FIP byte applies to the ARQ feedback IE 540.

For an alternate embodiment, the FIP 520 is eliminated, and the FN (frame number time stamp) 530 occupies the entire 8 bits of the byte.

Only one ARQ feedback IE 540 is shown in FIG. 5, however, this embodiment includes an FIP/FN byte (FIP 520 and the FN 530) for multiple ARQ feedback information elements (IEs). This embodiment can be advantageous because the overhead required to support multiple connections can be reduced. However, the multiple connections can be processed at the same time.

The embodiment of the ARQ feedback IE 540 of FIG. 5 includes a CID (connection identifier), a LAST, and Ack Type, a BSN, a Number of Ack. Maps, and Ack Map1 and an Ack Map2. The elements of the ARQ feedback IE are regulated by WiMAX standards committees.

Figure 6:
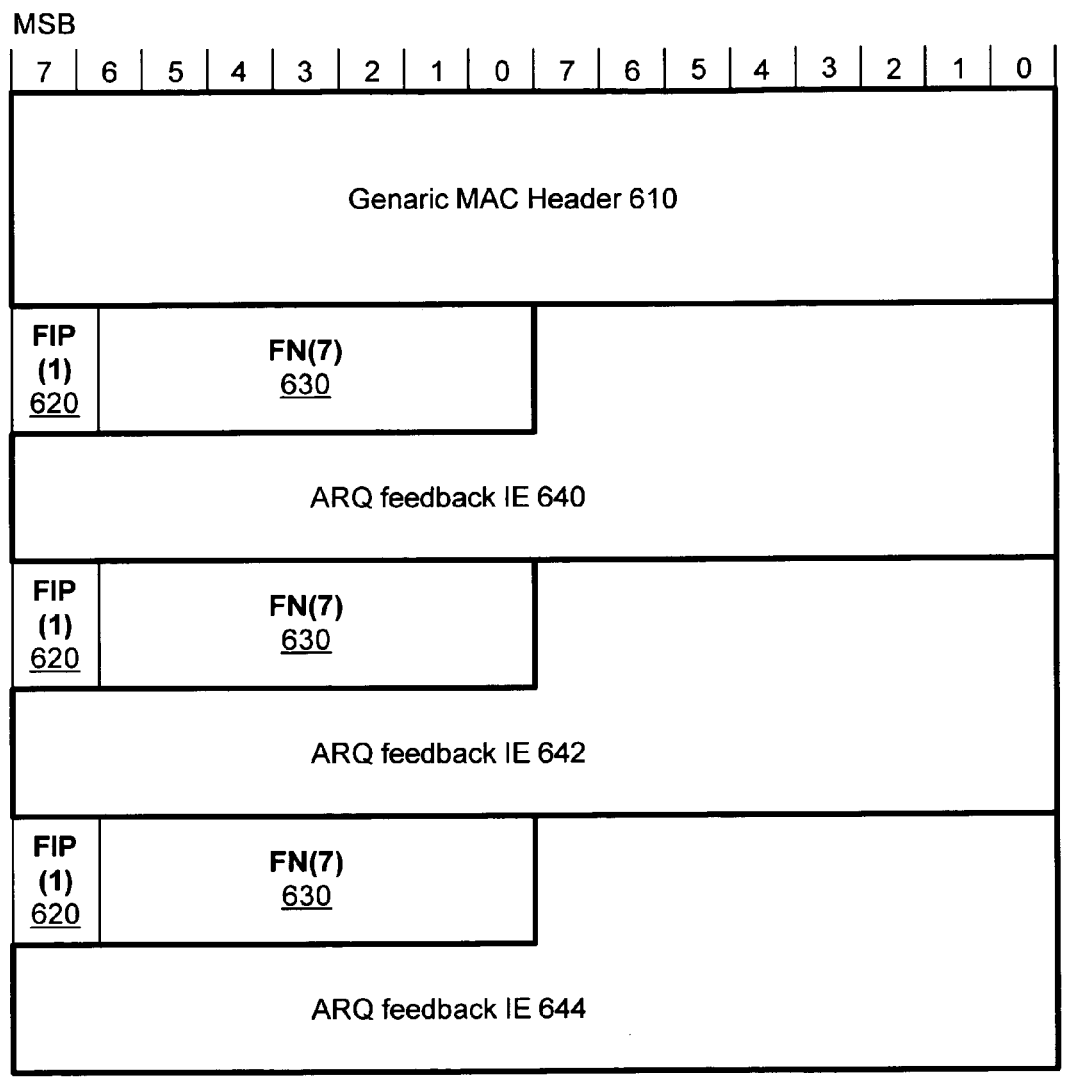
FIG. 6 shows another example of MAC PDU with and ARQ Feedback including a time stamp.

FIG. 6 shows another example of MAC (media access control) PDU (packet data unit) with an ARQ Feedback including a time stamp. This MAC PDU is configured differently than the MAC PDU of FIG. 5.

This embodiment includes an FIP/FN byte 620, 630 for each of multiple ARQ feedback information elements (IEs) 640, 642, 644. This embodiment can be advantageous because each of the connections of the ARQ feedback IEs can be processed at different times. However, the overhead must provide support for multiple connections.

As previously described, for an alternate embodiment, the FIP 620 is eliminated, and the FN (frame number time stamp) 630 occupies the entire 8 bits of the byte.

Figure 7:
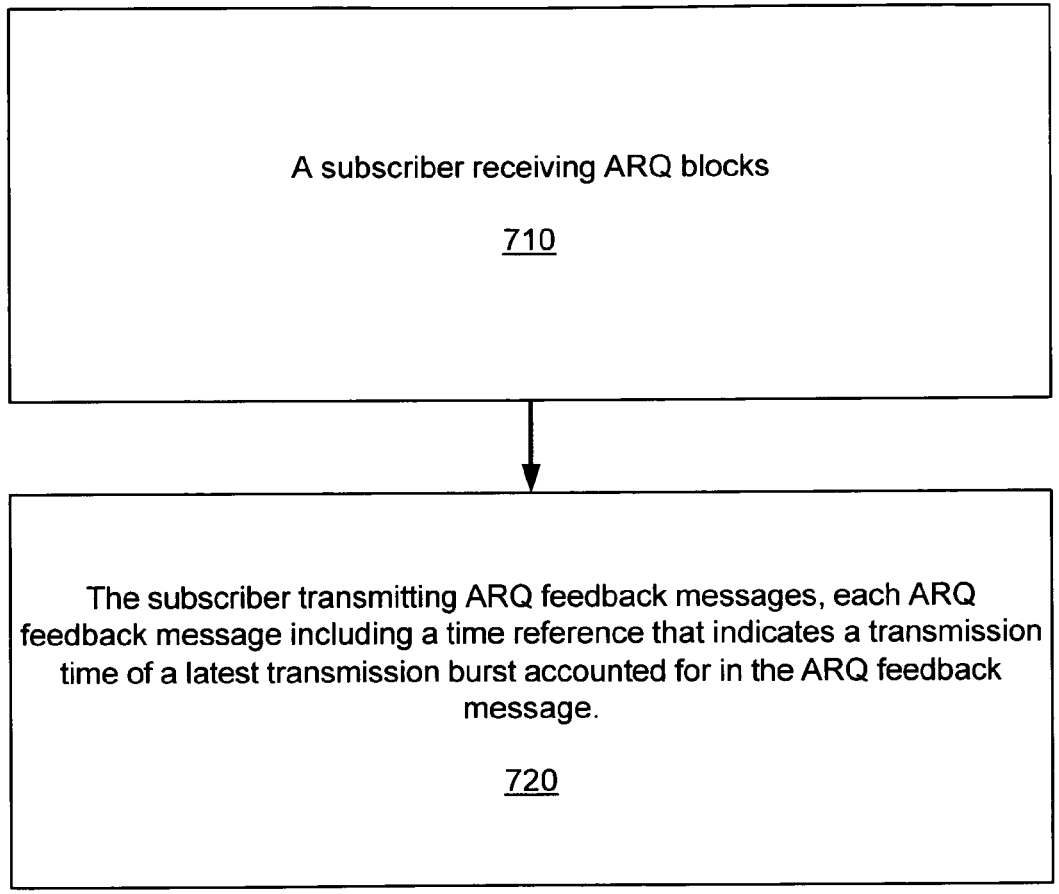
FIG. 7 is a flow chart that includes steps of an example of a method of a WiMAX subscriber providing ARQ feedback.

FIG. 7 is a flow chart that includes steps of an example of a method of a WiMAX subscriber providing ARQ feedback. A first step 710 of the method includes the subscriber receiving ARQ blocks. A second step 720 of the method includes the subscriber transmitting ARQ feedback messages, each ARQ feedback message including a time reference that indicates a transmission time of a latest transmission burst accounted for in the ARQ feedback message.

Although specific embodiments of the invention have been described and illustrated, the invention is not to be limited to the specific forms or arrangements of parts so described and illustrated. The invention is limited only by the appended claims.

What is claimed:

1. A method of automatic repeat request ARQ feedback comprising:
   receiving, by a communication device, one or more ARQ blocks; and
   transmitting an ARQ feedback message, by the communication device, wherein the ARQ feedback message includes a time reference indicating all frames accounted for in the ARQ feedback message,
   wherein the ARQ feedback message is within a wireless communication ARQ payload, and wherein the wireless communication ARQ payload includes a byte of data comprising the time reference.

2. The method of claim 1, wherein the time reference comprises a frame number.

3. The method of claim 1, wherein the ARQ feedback message accounts for all ARQ blocks transmitted before the ARQ feedback message is generated.

4. The method of claim 1, wherein a most significant bit of the byte indicates whether the time reference is included in the byte, and a least significant seven bits provide the time reference.

5. The method of claim 1, wherein the time reference applies to multiple feedback messages between a transmitter and a receiver.

6. The method of claim 1, wherein the ARQ feedback message indicates failure of reception of at least one ARQ block.

7. The method of claim 1, wherein 8 bits of the byte indicates the time reference.

8. An apparatus providing ARQ feedback comprising:
   a receiver configured to receive one or more ARQ blocks; and
   a transmitter configured to transmit an ARQ feedback message including a time reference that indicates all frames accounted for in the ARQ feedback message,
   wherein the ARQ feedback message is within a wireless communication ARQ payload, and wherein the wireless communication ARQ payload includes a byte of data comprising the time reference.

9. The apparatus of claim 8, wherein the time reference comprises a frame number.

10. The apparatus of claim 8, wherein the ARQ feedback message accounts for all ARQ blocks transmitted before the ARQ feedback message is generated.

11. The apparatus of claim 8, wherein a most significant bit of the byte indicates whether the time reference is included in the byte, and a least significant seven bits provide the time reference.

12. The apparatus of claim 8, wherein the time reference applies to multiple feedback messages between a transmitter and a receiver.

13. The method of claim 8, wherein an ARQ feedback message accounts for all ARQ blocks transmitted before the ARQ feedback message is generated.

14. The apparatus of claim 8, wherein 8 bits of the byte indicates the time reference.

15. A method of ARQ feedback comprising:
   receiving, by a communication device, one or more ARQ blocks; and
   transmitting a plurality of ARQ feedback messages, by the communication device, wherein each ARQ feedback message of the plurality includes a corresponding time reference indicating all frames accounted for in each ARQ feedback message of the plurality,
   wherein the plurality of ARQ feedback messages is within a wireless communication ARQ payload, and wherein the wireless communication ARQ payload includes a byte of data for each corresponding time reference.

16. The method of claim 15, wherein a corresponding time reference comprises a frame number.

17. The method of claim 15, an ARQ feedback message accounts for all ARQ blocks transmitted before the ARQ feedback message is generated.

18. The method of claim 15, wherein a most significant bit of each byte indicates whether a time reference is included in the byte, and a least significant seven bits provide the time reference.

19. The method of claim 15, wherein an ARQ feedback message indicates failure of reception of at least one ARQ block.

20. The method of claim 15, wherein 8 bits of each byte corresponds to a corresponding time reference.

* * * * *

UNITED STATES PATENT AND TRADEMARK OFFICE
CERTIFICATE OF CORRECTION

PATENT NO.         : 8,856,604 B2
APPLICATION NO.    : 12/221116
DATED              : October 7, 2014
INVENTOR(S)        : Brett Schein It is certified that error appears in the above-identified patent and that said Letters Patent is hereby corrected as shown below:

In the Claims

Column 5, line 12, please replace "ARQ" with --(ARQ)--.

Column 6, lines 15-17, please replace, "The method of claim 8, wherein an ARQ feedback message accounts for all ARQ blocks transmitted before the ARQ feedback message is generated." with --The apparatus of claim 8, wherein the ARQ feedback message indicates failure of reception of at least one ARQ block--.

Column 6, line 35, please replace "an ARQ" with --wherein an ARQ--.

Signed and Sealed this
First Day of September, 2015

Michelle K. Lee
*Director of the United States Patent and Trademark Office*